United States Patent [19]

Ezaki et al.

[11] Patent Number: 5,028,756
[45] Date of Patent: Jul. 2, 1991

[54] ELECTRODE WIRE FOR ELECTRIC SPARK CUTTING

[75] Inventors: Shigeo Ezaki, Osaka; Hiroyuki Seto; Hiroshi Hasegawa, both of Tokyo, all of Japan

[73] Assignees: Sumitomo Electric Industries, Ltd., Osaka; Tokyo Tungsten Co., Ltd., Tokyo, both of Japan

[21] Appl. No.: 422,650

[22] Filed: Oct. 17, 1989

[30] Foreign Application Priority Data

Oct. 18, 1988 [JP] Japan ............................ 63-262451
Oct. 19, 1988 [JP] Japan ............................ 63-263515

[51] Int. Cl.$^5$ .......................... B23H 7/08; B23H 1/06
[52] U.S. Cl. .............................. 219/69.12; 420/429; 420/430
[58] Field of Search ............ 420/429, 430, 431, 432; 219/69.15, 69.12; 204/224 M

[56] References Cited

U.S. PATENT DOCUMENTS

| | | | |
|---|---|---|---|
| 2,399,747 | 5/1946 | Linz | 420/429 |
| 2,678,269 | 5/1954 | Ham | 420/429 |
| 4,755,712 | 7/1988 | Mujahid et al. | 420/429 |
| 4,812,372 | 3/1989 | Kithany | 420/429 |

FOREIGN PATENT DOCUMENTS 43576 1/1982 European Pat. Off. ............ 420/429
54-4520 3/1979 Japan ............................ 219/69.15

OTHER PUBLICATIONS

"Fundamentals of the Pats, the Present, and the Future of Wire Technology for EDM Applications", 08/1988, *EDM Digest*, pp. 8–12, by Tomalin.

Primary Examiner—Geoffrey S. Evans
Attorney, Agent, or Firm—W. G. Fasse; D. H. Kane, Jr.

[57] ABSTRACT

A tungsten alloy is used as a material of an electrode wire for electric spark cutting. The tungsten alloy comprises one or more elements selected from the group consisted of Y, La, Ce, Pr, Nd, Pm, Sm, Eu, Gd, Tb, Dy, Ho, Er, Tm, Yb, Lu and oxides thereof. An electrode wire made of such a tungsten alloy handles an improved processing speed and the accuracy of the cut surface is also improved. The number of failures due to breaking of the electrode wire has been reduced and the tensile strength of the electrode wire has been increased. The same effect can be attained when a molybdenum alloy containing one or more oxides of elements selected from the group consisted of Al, Si and K is used as an alloying component in the alloy for making the electrode wire for electric spark cutting.

10 Claims, 2 Drawing Sheets

- ○ — 0%
- □ — 0.0010%
- △ — 0.0100%
- × — 0.1000%
- ● — 1.0%
- ■ — 1.5%

- ○ — K(0.0070%)
  Al(0.0020%)
  Si(0.0010%)
  CeO₂(0.0100%)

- ● — CeO₂(0.0100%)

ELECTRODE WIRE FOR ELECTRIC SPARK CUTTING

FIELD OF THE INVENTION

The present invention relates to an electrode wire for electric spark cutting and, more specifically, to electrode wires for wire electric spark cutting having a superior processability in electric spark cutting.

BACKGROUND INFORMATION

The wire electric spark cutting method is indispensable in the manufacture precision dies. In this method, a wire pulled with a prescribed force is moved in a direction intersecting a workpiece while spark discharging is applied to the workpiece. At the same time, the workpiece is moved in accordance with the desired shape to be processed.

Generally, a brass wire has been used as the electrode wire for electric spark cutting, (hereinafter referred to as cutting wire.

The cutting wire should have the following characteristics. Namely, (1) it must be capable of improving the processing speed;

(2) sticking material is not generated;

(3) it has a high accuracy of processing;

(4) it has a superior straightness; if the wire has superior straightness, the cutting wire will not be twisted or curled, so that the accuracy in processing can be improved and the number of failures due to breaking of the cutting wire can be reduced;

(5) the cross sectional shape of the cutting wire is close to a true circle; this improves the processing accuracy processing;

(6) it has a high tensile strength; which prevents a breaking of the cutting wire; and (7) it is conductive.

The following two metals satisfy the above described conditions.

One is pure tungsten. The tensile strength of the pure tungsten is approximately triple that of brass. Therefore, when the pure tungsten is used as a material for making the cutting wire, the diameter of the cutting wire can be reduced. Therefore, when a pure tungsten cut wire is and a more precise processing becomes possible.

Another metal for these purpose is pure molybdenum. The tensile strength of the pure molybdenum is approximately 1.6 times that of brass. Therefore, when the pure molybdenum is used as the material for the cutting wire, the diameter of the cutting wire can be reduced and a more precise processing becomes possible.

However, a cutting wire made of pure tungsten or of pure molybdenum has the following two drawbacks. First, the pure tungsten cutting wire and the pure molybdenum cutting wire have an inferior discharging capability, so that sparks are not very satisfactorily generated. Therefore, the processing speed becomes slow and the accuracy of the cut surface of the workpiece becomes inferior. The number of failures due to breaking of the cutting wire is increased.

The second drawback is as follows. The pure tungsten cutting wire and the pure molybdenum cutting wire a lower tensile strength at high temperature, so that when strains are generated in the wires at high temperature. The accuracy of the cut surface of the workpiece is reduced.

SUMMARY OF THE INVENTION

It is an object of the present invention to provide a cutting wire capable of improving processing speed, the of the cut surface of the workpiece and the tensile strength.

Another object of the present invention is to reduce number of failures due to breakage of the cutting wire.

A still further object of the present invention is to provide a cutting wire having a sufficient tensile strength even at a high temperature.

The cutting wire in accordance with the present invention employs an alloy for making the cutting wire.

In accordance with a first aspect of the present invention, a tungsten alloy is used as the material for making the cutting wire. The tungsten alloy contains one or more components selected from the group consisting of Y, La, Ce, Pr, Nd, Pm, Sm, Eu, Gd, Tb, Dy, Ho, Er, Tm, Yb, Lu, hereinafter referred to as rare earth elements, and oxides thereof.

In a second aspect of the present invention, a molybdenum alloy is used as the material for making the cutting wire. The molybdenum alloy contains one or more oxides of elements selected from the group consisting of Al, Si and K.

The tungsten alloy containing one or more of the above mentioned rare earth elements and oxides of these elements has a characteristic called an emission effect which facilitates the emmission of electrons. Therefore, the current flows more easily through the cutting wire formed of the tungsten alloy thereby increasing the discharging capability. Consequently, the cutting wire made of tungsten alloy has an improved spark generation. Consequently, the processing speed and the accuracy of the cut surface of the workpiece can be increased and the number of failures breaking of the cutting wire is reduced.

The tensile strength of the above tungsten alloy is higher than that of pure tungsten at high temperature. Therefore, even if the wire is heated to a high temperature during the wire electric spark cutting, the strains in the wire can be reduced, whereby, the accuracy of cut surface of the workpiece is improved.

In addition, due to the higher tensile strength of the tungsten alloy, the cutting wire can be made to have a smaller outer diameter whereby processing of smaller workpieces becomes possible.

In the second embodiment of the present invention, wherein the above disclosed molybdenum alloy is used to make the cutting wire, the wire has a characteristic called an emission effect whereby the emission of electrons is facilitated for an improved current flow through the cutting wire which increases the discharging capability and sparks are effectively produced. The processing speed and the accuracy of the cut surface of the workpiece is improved, and the number of failures due to breaking of the cutting wire has been reduced.

In the molybdenum alloy containing one or more of the oxides of Al, Si and K, the fine particles of the oxides are uniformly dispersed in the molybdenum, so that the recrystallization temperature of the molybdenum alloy becomes higher, and accordingly the tensile strength of the molybdenum alloy at high temperature is improved. Therefore, even if the wire is heated to a high temperature during the wire electric spark cutting, the strains in the wire are reduced. Consequently, the accuracy of the cut surface of the workpiece can be improved.

In addition, compared with the pure molybdenum, the molybdenum alloy mentioned above has a higher tensile strength, whereby a cutting wire having a smaller outer diameter can be manufactured. This enables processing of small workpieces.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

First Embodiment

Tungsten alloy wires containing 0.0010, 0.0100, 0.1000, 1.0 and 1.5 wt % of $CeO_2$, respectively were formed by the following method.

$CeO_2$ powder having the average grain diameter of 0.5 to 1.0 $\mu$m, was mixed with commercially available tungsten powder having the average grain diameter of 3 to 5 $\mu$m with a purity of 99.99%, to provide an alloying powder.

The alloying powder was introduced into a die, and it was pressed with a pressure of about 3 ton/cm$^2$ to form a prismatic bar powder molded body.

The powder molded body was temporarily sintered in a hydrogen gas atmosphere at about 1,200° C.

The powder molded body temporarily sintered was subjected to direct conduction sintering in a hydrogen gas atmosphere at about 3,000° C. to form an ingot.

The ingot was repeatedly rolled, heat treated, rolled drawn, heat treated and drawn to produce a tungsten alloy wire having the diameter of 50 $\mu$m on which electrolytic treatment was carried out, with the graphite removed.

The following tests and measurements were carried out using the tungsten alloy cutting wires formed by the above described steps.

(1) Tension tests at various temperatures shown in Table 1 were carried out, whereby the tension speed was 0.1 mm/min.

(2) Measurements were made of the processing speed during the electric spark cutting, of the surface roughness of the workpiece and of the number of failures due to breaking of the wire as shown in Table 2.

The measurements of (2) were carried out by using a commercially available wire cutting electric spark machine.

The operating conditions of electric spark cutting were as shown in Table 3.

For comparison, the test and measurements of (1) and (2) were carried out by using a commercially available pure tungsten cutting wire.

Figure 1:
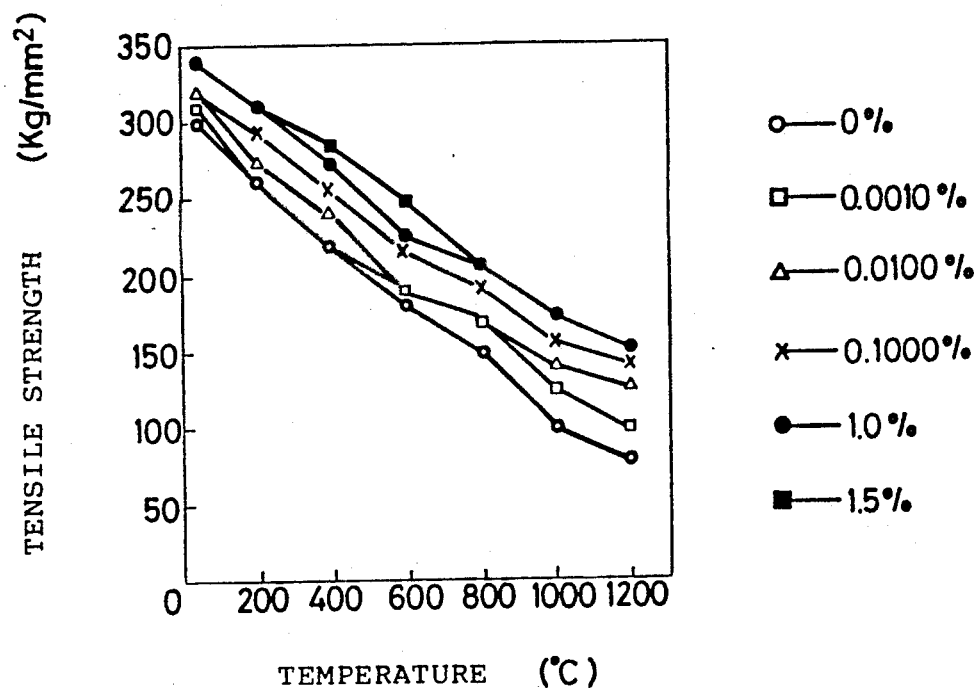
FIG. 1 is a graph showing the results of tension tests made with a cutting wire of the first embodiment.

The results are shown in Tables 1 and 2. The result of the tension test is also shown in FIG. 1.

TABLE 1

| weight % of $CeO_2$ in W | tensile strength (kgf/mm$^2$) test temperature (°C.) | | | | | | | remarks |
|---|---|---|---|---|---|---|---|---|
| | 20 | 200 | 400 | 600 | 800 | 1000 | 1200 | |
| 0 (pure tungsten) | 300 | 260 | 220 | 180 | 150 | 100 | 80 | for comparison |
| 0.0010 | 310 | 260 | 220 | 190 | 170 | 130 | 100 | present invention |
| 0.0100 | 320 | 270 | 240 | 190 | 170 | 140 | 130 | present invention |
| 0.1000 | 320 | 290 | 260 | 220 | 190 | 160 | 140 | present invention |
| 1.0 | 340 | 310 | 270 | 230 | 210 | 170 | 150 | present invention |
| 1.5 | 340 | 310 | 280 | 250 | 210 | 170 | 150 | present invention |

TABLE 2

| weight % of $CeO_2$ in W | processing speed (mm$^2$/min) | surface roughness Rmax ($\mu$m) | number of breaking of wire (times) | remarks |
|---|---|---|---|---|
| 0 (pure tungsten) | 0.17 | 3.8 | 6 | for comparison |
| 0.0010 | 0.19 | 3.0 | 1 | present invention |
| 0.0100 | 0.20 | 2.5 | 0 | present invention |
| 0.1000 | 0.25 | 1.7 | 0 | present invention |
| 1.0 | 0.26 | 1.6 | 0 | present invention |
| 1.5 | 0.26 | 1.6 | 5 | present invention |

TABLE 3

1. Processing machine used: Sodic Corp. AP150 (process in oil)
2. Wire size: 50 $\phi\mu$m × 2000 m
3. Workpiece: SKD-11 10 mm/thickness (quenched material) straight line cutting
4. Process condition & effect: upper & lower nozzle pressure 0.6 kg/cm$^2$

| ON | OFF | IP | HP2 | MA | SV | V | SF | C | T (V) | WS (notch) | OFF SET | processing voltage (V) | processing current (A) |
|---|---|---|---|---|---|---|---|---|---|---|---|---|---|
| 0 | 20 | 2 | 0 | 59 | 1 | 4 | 8 | 0 | 1 | 4 | 45 | 60 ~ 70 | 0.02 |

Referring to Table 1 and FIG. 1, when $CeO_2$ is contained in the tungsten, the tensile strength at each temperature is increased as the content of $CeO_2$ is increased from 0% (bottom curve) to 1.5% (top curve) in FIG. 1.

Figure 2:
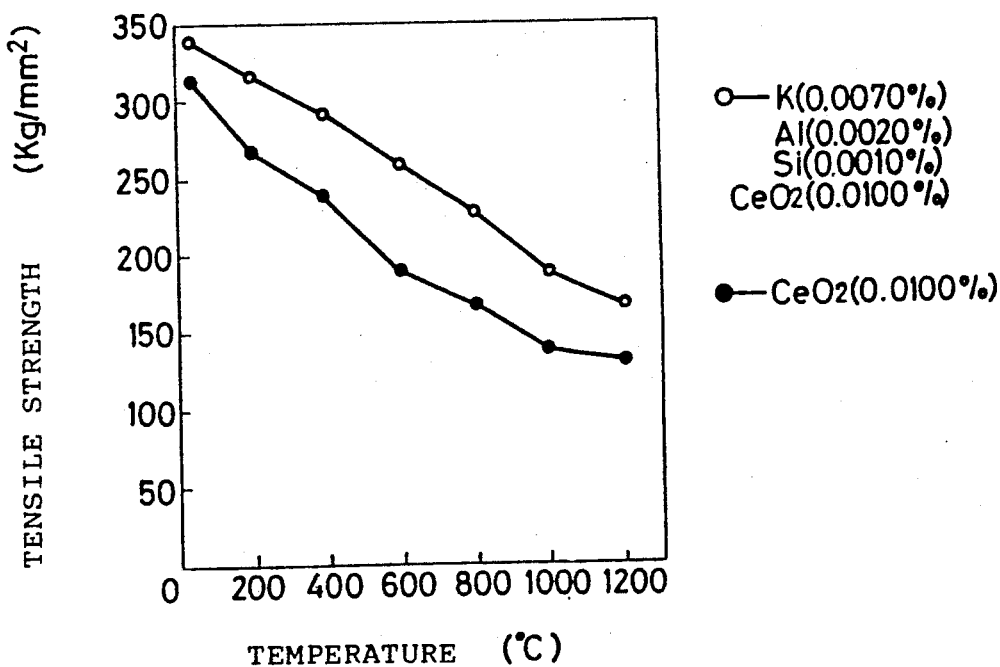
FIG. 2 is a graph showing the results of tension tests made with a cutting wire of the third embodiment.

Referring to FIG. 2, when $CeO_2$ is contained in the tungsten, the processing speed of the electric spark cutting and the surface roughness of the workpiece is increased and reduced, respectively, as more and more $CeO_2$ is contained in the alloy. Especially when the content of $CeO_2$ exceeds 0.1000 wt %, the processing speed is remarkably increased and the surface roughness is remarkably reduced.

The number of failures due to breaking of the cutting wire is considerably increased when the content of $CeO_2$ in the tungsten alloy exceeds the range from 0.0010 wt % to 1.0 wt %.

The reason for the increase in the tendency of the cutting wire to break is seen in that when the content of $CeO_2$ is less than 0.0010 wt %, the emission effect is hardly generated and the discharging capability is not very much improved. However, if the content of $CeO_2$ exceeds 1.0 wt %, the cutting wire becomes brittle.

Second Embodiment

Tungsten alloy cutting wires containing a total wt % of 0.0010, 0.0100, 0.1000, 1.0 and 1.5 of $La_2O_3$, $Y_2O_3$ and $CeO_2$ were formed by the same method as described above for the first embodiment. The tension tests yielded results shown in Table 4 at respective temperatures. The processing speeds during an electric spark cutting yielded the surface roughnesses of the workpiece and the number of failures due to breaking of the wire as shown in Table 5. These tests were carried out under the same condition as the first embodiment.

For comparison, the same tests and the measurements were carried out on a commercially available pure tungsten cutting wire.

The respective results are shown in Tables 4 and 5.

The contents also of $La_2O_3$, $Y_2O_3$ and $CeO_2$ in wt % are shown in Table 6.

TABLE 4

| total weight % of $La_2O_3$, $Y_2O_3$ & $CeO_2$ in W | tensile strength (kgf/mm²) test temperature (°C.) | | | | | | | remarks |
|---|---|---|---|---|---|---|---|---|
| | 20 | 200 | 400 | 600 | 800 | 1000 | 1200 | |
| 0 (pure tungsten) | 300 | 260 | 220 | 180 | 150 | 100 | 80 | for comparison |
| 0.0010 | 310 | 260 | 220 | 190 | 160 | 105 | 100 | present invention |
| 0.0100 | 310 | 280 | 245 | 195 | 165 | 140 | 130 | present invention |
| 0.1000 | 320 | 300 | 260 | 225 | 195 | 160 | 140 | present invention |
| 1.0 | 330 | 310 | 270 | 230 | 210 | 170 | 150 | present invention |
| 1.5 | 340 | 310 | 280 | 250 | 215 | 175 | 155 | present invention |

TABLE 5

| total weight % of $La_2O_3$, $Y_2O_3$ & $CeO_2$ in W | processing speed (mm²/min) | surface roughness Rmax (μm) | number of breaking of wire (times) | remarks |
|---|---|---|---|---|
| 0 (pure tungsten) | 0.17 | 3.5 | 5 | for comparison |
| 0.0010 | 0.20 | 3.1 | 1 | present invention |
| 0.0100 | 0.21 | 2.4 | 0 | present invention |
| 0.1000 | 0.26 | 1.8 | 0 | present invention |
| 1.0 | 0.26 | 1.8 | 0 | present invention |
| 1.5 | 0.26 | 1.8 | 5 | present invention |

TABLE 6

| total weight % of $La_2O_3$, $Y_2O_3$ & $CeO_2$ in W | $La_2O_3$ (weight %) | $Y_2O_3$ (weight %) | $CeO_2$ (weight %) |
|---|---|---|---|
| 0 | 0 | 0 | 0 |
| 0.0010 | 0 | 0.0010 | 0 |
| 0.0100 | 0.0050 | 0.0025 | 0.0025 |
| 0.1000 | 0.0250 | 0.0500 | 0.0250 |
| 1.0 | 0.2500 | 0.2500 | 0.5000 |
| 1.5 | 1.0 | 0.2500 | 0.2500 |

Referring to Table 4, when $La_2O_3$, $Y_2O_3$ and $CeO_2$ are contained in tungsten, then the tensile strength at each temperature is increased as the total content of $La_2O_3$, $Y_2O_3$ and $CeO_2$ is increased.

Referring to Table 5, when $La_2O_3$, $Y_2O_3$ and $CeO_2$ are contained in the tungsten alloy, then the processing speed in the electric spark cutting and the surface roughness of the workpiece are increased and reduced, respectively, as the total content of $La_2O_3$, $Y_2O_3$ and $CeO_2$ is increased. Especially when the total content is not less than 0.100 wt %, the processing speed can be remarkably increased and the surface roughness is remarkably reduced.

The number of failures due to breaking of the wire, is increased considerably when the total content of $La_2O_3$, $Y_2O_3$ and $CeO_2$ in the tungsten alloy is outside the range of 0.0010 wt % to 1.0 wt %.

The same results as shown in Tables 4 and 5 are obtained when other combinations are used for the test.

When one or more of K, Si, Al and oxides thereof, hereinafter referred to as second contained materials are included in the tungsten alloy in addition to one or more of the above mentioned rare earth elements and the oxides thereof, then the second contained materials uniformly disperse in the tungsten alloy, whereby, the tensile strength of the cut wire is improved. This will be described with reference to the embodiment 3.

Third Embodiment

A tungsten alloy cutting wire containing 0.0100 wt % of $CeO_2$, 0.0070 wt % of K, 0.0020 wt % of Al and 0.0010 wt % of Si was manufactured in the following manner.

A·P·W (Ammonium Para Wolframade) which was one of the tungsten compounds used as a starting material, was reduced by means of hydrogen to provide blue oxide of $WO_{2.72}$.

The Blue Oxide was doped with a mixed solution of $K_2O$ and $SiO_2$, aluminum chloride solution and cerium chloride solution, and then the material in the solution is dried. The product "OHKASIL" produced by Tokyo Ohka Kogyo Co., Ltd. was used as the mixed solution of $K_2O$ and $SiO_2$. "OHKASIL" is a trademark for "POTASSIUM SILICATE".

The OHKASIL was reduced by means of hydrogen to form tungsten powder with a doping medium.

Using the so obtained tungsten powder, a tungsten alloy cutting wire having a diameter of 50 μm was produced in the same manner as in the first embodiment. The wire was subjected to an electrolytic treatment.

The tension tests resulted in tensile strengths at respective temperatures as shown in Table 7. The processing speeds used for the electric spark cutting, the surface roughness of the cut workpiece and the number of failures due to breaking of the cutting wire are shown in Table 8. These tests were performed under the same conditions as in the first embodiment.

As mentioned, the the results are shown in Tables 7 and 8. The result of tension tests is also shown in FIG. 2.

TABLE 7

| | tensile strength (kgf/mm²) test temperature (°C.) | | | | | | | |
|---|---|---|---|---|---|---|---|---|
| | 20 | 200 | 400 | 600 | 800 | 1000 | 1200 | remarks |
| W containing K, Al, Si & CeO₂ | 340 | 320 | 290 | 260 | 230 | 190 | 170 | present invention |

TABLE 8

| | processing speed (mm²/min) | surface roughness Rmax (μm) | number of breaking of wire | remarks |
|---|---|---|---|---|
| W containing K, Al, Si & CeO₂ | 0.20 | 2.5 | 0 | present invention |

Referring to Tables 1 and 7, the tensile strength of the cut wire containing 0.0100 wt % of CeO₂ and K, Al and Si is improved to approximately 1.3 times the tensile strength of the cutting wire containing only CeO₂ of 0.0100 wt %.

As shown in Tables 2 and 8, the processing speed of the electric spark cutting, the surface roughness of the workpiece, and the number of failures due to breaking of the cutting wire containing only CeO₂ of 0.0100 wt %, are the same as those of the cutting wire containing K, Al and Si in addition to 0.0100 wt % of CeO₂.

The content of K, Si, Al and oxides thereof should preferably be in the range of 0.0010 to 0.1000 wt %. The reason for this is, that when the content is less than 0.0010 wt % the tensile strength is approximately the same as that of pure tungsten. However, if said content exceeds 0.1000 wt %, the cutting wire becomes brittle and wire cracks and tends to break as it is being manufactured decreasing the production yield of the cutting wires.

Fourth Embodiment

Molybdenum alloy wires having the compositions shown in Table 9, were manufactured by using the following method. The reference character "ppm" represents the ratio in weight. The method is in same as the general powder metallurgy.

MoO₃ powder having a purity of 99.999% was reduced by means of hydrogen to provide MoO₂ powder.

A mixed solution (OHKASIL) including K-Si in the form of K₂O and SiO₂ and an aluminum chloride solution were added to MoO₂ powder, water was evaporated during stirring the solution, and the material in the solution was dried.

The doped MoO₂ powder was reduced by means of hydrogen to form doped Mo powder having an average grain diameter within the range of 3 to 5 μm.

Thereafter, the doped Mo powder is pressed in a die to form a prismatic bar powder molded body. The pressing pressure was about 3 ton/cm².

The powder molded body was temporarily sintered in a hydrogen atmosphere at about 1,000° C.

The temporarily sintered powder molded body was subjected to direct conduction sintering in the hydrogen atmosphere at about 2,200° C. to form an ingot.

The ingot was rolled, heat treated and rolled again. The drawing and heat treatment were repeated on the ingot to produce molybdenum alloy wires having a diameter of 70 μm. The wire was subjected to an electrolytic treatment for removing graphite.

The following tests and measurements were carried out with the molybdenum alloy cutting wires produced as just described.

(1) Tension tests were made at respective temperatures shown in Table 11. The tension application speed was 0.1 mm/min.

(2) The processing speed during electric spark cutting was measured along with the surface roughness of the workpiece and the number of failures due to breaking of the wire as shown in Table 12.

The measurements (2) were carried out by using a commercially available wire cutting electric spark machine. The conditions of electric spark cutting operation are shown in Table 10.

The results are shown in Tables 11 and 12. For comparison, the test and measurements (1) and (2) were also carried out on a commercially available pure molybdenum cutting wire. As shown in Table 9, pure Mo (sample number 1) includes very little Al, K and Si, respectively, which are inevitable natural impurities.

TABLE 9

| sample No. | Al (ppm) | K (ppm) | Si (ppm) | total amount (ppm) | remarks |
|---|---|---|---|---|---|
| 1 | 1 | 6 | 5 | 12 | for comparison (pure Mo) |
| 2 | 25 | 15 | 15 | 55 | present invention |
| 3 | 1 | 100 | 4 | 105 | present invention |
| 4 | 1 | 5 | 100 | 106 | present invention |
| 5 | 2 | 105 | 5 | 112 | present invention |
| 6 | 110 | 5 | 5 | 120 | present invention |
| 7 | 220 | 100 | 250 | 570 | present invention |
| 8 | 1 | 5 | 850 | 856 | present invention |
| 9 | 900 | 6 | 5 | 911 | present invention |
| 10 | 1 | 1000 | 5 | 1006 | present invention |
| 11 | 155 | 20 | 870 | 1045 | present invention |
| 12 | 370 | 390 | 350 | 1110 | present invention |
| 13 | 1 | 1350 | 5 | 1356 | present invention |
| 14 | 1350 | 5 | 6 | 1361 | present invention |
| 15 | 1 | 5 | 1380 | 1386 | present invention |
| 16 | 560 | 410 | 420 | 1390 | present invention |
| 17 | 950 | 400 | 200 | 1550 | present invention |

TABLE 10

1. Processing machine used: Sodic Corp. AP150 (process in oil)
2. Wire size: 70 φμm × 2000 m
3. Workpiece: SKD-11 10 mm/thickness (quenched material) straight line cutting
4. Process condition & results: upper & lower nozzle pressure 0.6 kg/cm²

| ON | OFF | 1P | HP2 | MA | SV | V | SF | C | T (V) | WS (notch) | OFF SET | processing voltage (V) | processing current (A) |
|---|---|---|---|---|---|---|---|---|---|---|---|---|---|
| 1 | 1 | 0 | 60 | 99 | 10 | 0 | 8 | 0 | 6 | 4 | 51 | 150 ± 10 | 0.1 |

TABLE 11

| sample No. | tensile strength (kgf/mm²) test temperature (°C.) | | | | | | | remarks |
|---|---|---|---|---|---|---|---|---|
| | 20 | 200 | 400 | 600 | 800 | 1000 | 1200 | |
| 1 | 170 | 100 | 85 | 75 | 55 | 50 | 40 | for comparison (pure Mo) |
| 2 | 170 | 100 | 85 | 76 | 57 | 51 | 42 | present invention |
| 3 | 185 | 145 | 95 | 87 | 60 | 54 | 45 | present invention |
| 4 | 185 | 145 | 95 | 87 | 61 | 54 | 45 | present invention |
| 5 | 190 | 150 | 100 | 90 | 60 | 55 | 45 | present invention |
| 6 | 190 | 150 | 95 | 90 | 60 | 55 | 45 | present invention |
| 7 | 190 | 160 | 115 | 95 | 66 | 60 | 50 | present invention |
| 8 | 195 | 163 | 119 | 98 | 69 | 65 | 55 | present invention |
| 9 | 195 | 163 | 120 | 100 | 70 | 65 | 55 | present invention |
| 10 | 200 | 165 | 120 | 103 | 70 | 67 | 58 | present invention |
| 11 | 200 | 165 | 125 | 105 | 72 | 67 | 58 | present invention |
| 12 | 210 | 165 | 135 | 105 | 75 | 69 | 60 | present invention |
| 13 | 210 | 170 | 140 | 107 | 77 | 69 | 65 | present invention |
| 14 | 210 | 170 | 140 | 107 | 77 | 70 | 65 | present invention |
| 15 | 210 | 170 | 140 | 105 | 76 | 70 | 65 | present invention |
| 16 | 210 | 170 | 140 | 105 | 75 | 70 | 65 | present invention |
| 17 | 220 | 170 | 140 | 110 | 80 | 70 | 65 | present invention |

TABLE 12

| sample No. | processing speed (mm²/min) | surface roughness Rmax (μm) | number of breaking of wire (times) | remarks |
|---|---|---|---|---|
| 1 | 0.10 | 3.5 | 10 | for comparison (pure Mo) |
| 2 | 0.10 | 3.4 | 8 | present invention |
| 3 | 0.13 | 3.0 | 0 | " |
| 4 | 0.13 | 3.0 | 0 | " |
| 5 | 0.13 | 3.0 | 0 | " |
| 6 | 0.13 | 3.0 | 0 | " |
| 7 | 0.14 | 2.0 | 0 | " |
| 8 | 0.13 | 1.6 | 0 | " |
| 9 | 0.14 | 1.5 | 0 | " |
| 10 | 0.15 | 1.3 | 0 | " |
| 11 | 0.15 | 1.2 | 0 | " |
| 12 | 0.18 | 1.2 | 0 | " |
| 13 | 0.19 | 1.0 | 0 | " |
| 14 | 0.19 | 1.1 | 0 | " |
| 15 | 0.20 | 1.0 | 1 | " |
| 16 | 0.20 | 1.0 | 1 | " |
| 17 | 0.20 | 1.0 | 10 | " |

Referring to Tables 9 and 11, when oxides of one more of the elements selected from the group consisting of Al, Si and K, hereinafter referred to as a first group, are contained in molybdenum, the tensile strength at respective temperatures is increased as the total content of the elements is increased.

Referring to samples No. 6, No. 9 and No. 14, when only the oxide of Al is contained in molybdenum, the tensile strength at respective temperatures is increased as the content of Al is increased.

Referring to samples No. 3, No. 5, No. 10 and 13, when only the oxide of K is contained in molybdenum, the tensile strength at respective temperatures is increased as the content of K is increased.

Referring to samples No. 4, No. 8 and No. 15, when only the oxide of Si is contained in molybdenum, the tensile strength at respective temperatures is increased as the content of Si is increased.

Referring to Tables 9 and 12, when the oxides of the elements selected from the first group are contained in molybdenum, the processing speed in the electric spark cutting and the surface roughness of the workpiece are increased and reduced, respectively, as the total content of the first group elements is increased.

The number of failures due to breaking of the wire is considerably increased when the total content of the first group elements goes out of the range of 100 ppm to 1,400 ppm in weight ratio, for the following reasons. First, the discharging capability is not much improved when the content is less than 100 ppm, as the emission effect is not easily generated. Second, if the content exceeds 1,400 ppm, the cut wire becomes brittle.

Referring to samples No. 6, No. 9 and No. 14, when only oxide of Al is contained in molybdenum, the processing speed in electric spark cutting and the surface roughness of the workpiece are increased and reduced, respectively, as the content of Al oxide is increased.

Referring to samples No. 3, No. 5, No. 10 and No. 13, when only the oxide of K is contained in molybdenum, the processing speed in electric spark cutting and the surface roughness of the workpiece are increased and reduced, respectively, as the content of K oxide is increased.

Referring to samples No. 4, No. 8 and No. 15, when only the oxide of Si is contained in molybdenum, the processing speed in electric spark cutting and the surface roughness of the workpiece are increased and reduced, respectively, as the content of Si oxide is increased.

When one or more of Fe, Ni and Cr are contained in the molybdenum alloy also containing one or more oxides of the elements selected from the group consisting of Al, Si and K, the discharging capability and the tensile strength at high temperature are improved compared to an alloy containing one or more of the oxides of Al, Si and K, only. The reason for this may be the fact that Fe, Ni and Cr are more easily ionized. This will be described in the fifth embodiment.

Fifth Embodiment

Molybdenum alloy wires having such compositions as are shown in Table 13, were manufactured by the following method.

Solutions of Fe, Ni and Cr having a nitric acid group, respectively, were added to the doped Mo powder manufactured by the same method as in the fourth embodiment.

Thereafter, the water was evaporated and the material in the solution was dried and reduced in a hydrogen atmosphere, to form the power doped with Fe, Ni and Cr.

Thereafter, the doped powder was pressed in a die to form a prismatic bar powder molded body under a pressure of about 3 ton/cm$^2$.

The powder molded body was temporarily sintered in the hydrogen atmosphere at about 1,000° C.

The temporarily sintered powder molded body was subjected to direct conduction sintering in a hydrogen atmosphere at about 2,200° C. to form an ingot.

The ingot was rolled, heat treated and rolled again.

Thereafter, the ingot was drawn and heat treated repeatedly, to make molybdenum alloy wires having a diameter of 70 μm. The wires were subjected to an electrolytic treatment to remove graphite.

The tension test at respective temperatures shown in Table 14, and measurements shown in Table 15 of the processing speed of the electric spark cutting, surface roughness of the workpiece and the number of failures due to breaking of the wire were carried out under the same conditions as the fourth embodiment.

The results are shown in Tables 14 and 15.

TABLE 13

| sample No. | Al (ppm) | K (ppm) | Si (ppm) | Fe (ppm) | Ni (ppm) | Cr (ppm) | total amount (Fe + Ni + Cr) (ppm) | remarks |
|---|---|---|---|---|---|---|---|---|
| 18 | 220 | 100 | 250 | 1 | 1 | 1 | 3 | for comparison |
| 19 | 220 | 100 | 250 | 10 | 1 | 1 | 12 | present invention |
| 20 | 210 | 110 | 250 | 1 | 1 | 12 | 14 | '' |
| 21 | 220 | 105 | 250 | 1 | 15 | 1 | 17 | '' |
| 22 | 220 | 100 | 240 | 100 | 1 | 1 | 102 | '' |
| 23 | 220 | 100 | 250 | 1 | 1 | 100 | 102 | '' |
| 24 | 220 | 105 | 240 | 1 | 110 | 1 | 112 | '' |
| 25 | 220 | 105 | 230 | 100 | 150 | 50 | 300 | '' |
| 26 | 220 | 100 | 250 | 400 | 1 | 1 | 402 | '' |
| 27 | 215 | 100 | 240 | 1 | 450 | 1 | 452 | '' |
| 28 | 220 | 105 | 250 | 1 | 1 | 450 | 452 | '' |
| 29 | 220 | 100 | 250 | 300 | 200 | 100 | 600 | '' |
| 30 | 560 | 400 | 430 | 200 | 200 | 100 | 500 | '' |

TABLE 14

| sample No. | tensile strength (kgf/mm$^2$) test temperature (°C.) | | | | | | | remarks |
|---|---|---|---|---|---|---|---|---|
| | 20 | 200 | 400 | 600 | 800 | 100 | 1200 | |
| 18 | 190 | 160 | 120 | 100 | 66 | 60 | 50 | for comparison (pure Mo) |
| 19 | 190 | 160 | 115 | 96 | 67 | 61 | 52 | present invention |
| 20 | 190 | 160 | 116 | 96 | 67 | 62 | 52 | present invention |
| 21 | 190 | 160 | 115 | 95 | 67 | 61 | 52 | present invention |
| 22 | 200 | 165 | 127 | 105 | 73 | 65 | 57 | present invention |
| 23 | 200 | 165 | 128 | 105 | 73 | 65 | 57 | present invention |
| 24 | 200 | 165 | 126 | 106 | 74 | 65 | 57 | present invention |
| 25 | 220 | 170 | 140 | 110 | 80 | 70 | 65 | present invention |
| 26 | 220 | 170 | 140 | 110 | 80 | 70 | 65 | present invention |
| 27 | 220 | 170 | 140 | 111 | 82 | 71 | 66 | present invention |
| 28 | 220 | 170 | 140 | 112 | 82 | 72 | 66 | present invention |
| 29 | 210 | 165 | 135 | 105 | 75 | 70 | 60 | present invention |
| 30 | 230 | 180 | 150 | 120 | 85 | 75 | 70 | present invention |

TABLE 15

| sample No. | processing speed (mm$^2$/min) | surface roughness Rmax (μm) | number of breaking of wire (times) | remarks |
|---|---|---|---|---|
| 18 | 0.14 | 2.0 | 0 | for comparison (pure Mo) |
| 19 | 0.14 | 2.0 | 0 | present invention |
| 20 | 0.14 | 2.1 | 0 | '' |
| 21 | 0.14 | 2.1 | 0 | '' |
| 22 | 0.16 | 1.5 | 0 | '' |
| 23 | 0.16 | 1.4 | 0 | '' |
| 24 | 0.17 | 1.4 | 0 | '' |
| 25 | 0.20 | 1.0 | 0 | '' |
| 26 | 0.21 | 0.9 | 0 | '' |
| 27 | 0.21 | 0.9 | 1 | '' |
| 28 | 0.21 | 0.9 | 1 | '' |
| 29 | 0.22 | 0.8 | 6 | '' |
| 30 | 0.23 | 0.8 | 1 | '' |

Let us compare No. 25 of Table 14 with No. 8 of Table 11.

According to Table 9, the total content of Al, K and Si is 856 ppm (weight ratio in No. 8).

According to Table 13, the total content of Al, K, Si, Fe, Ni and Cr in no. 25 is 855 ppm (weight ratio).

When we compare No. 25 of Table 14 with No. 8 of Table 11, the tensile strength at respective temperatures of No. 25 is larger than that of No. 8.

Namely, the tensile strength is further increased when Fe, Ni and Cr are added to the oxide of the elements in the first group, compared with the case where only the oxide of the elements of the first group is added.

Figure 3:
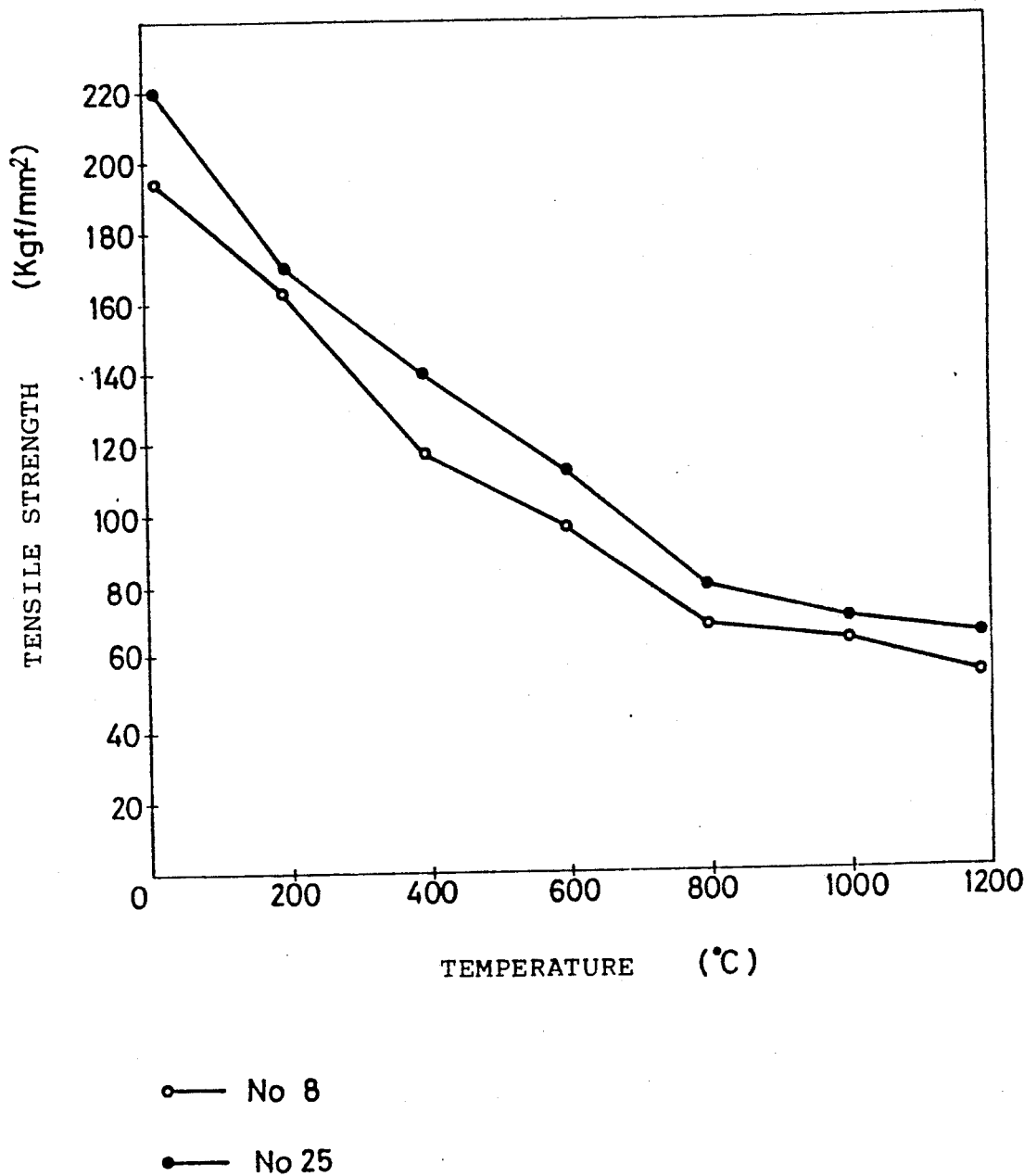
FIG. 3 is a graph showing the result of tension tests made with a cutting wire of samples No. 8 of the fourth embodiment and No. 25 of the fifth embodiment.

The results of the tension test of No. 8 and No. 25 are also shown in FIG. 3.

When we compare No. 25 of Table 15 with No. 8 of Table 12, the increase in the processing speed and the decrease in the surface roughness of No. 25 are more pronounced, than those of No. 8.

Namely, the processing speed and the surface roughness are increased and decreased, respectively, when Fe, Ni and Cr are added to the oxides of the elements of the first group.

Table 14 shows the following facts.

Referring to samples No. 19, No. 22 and No. 26, even when only Fe out of Fe, Ni and Cr is contained in the alloy of which the cutting wire is made the tensile strength at respective temperatures is increased as the content of Fe is increased.

Referring to samples No. 21, 24 and No. 27, even when only Ni out of Fe, Ni and Cr is contained in the alloy, the tensile strength at respective temperatures is increased as the content of Ni is increased.

Referring to samples No. 20, No. 23 and No. 28, even when only Cr out of Fe, Ni and Cr is contained in the alloy, the tensile strength at respective temperatures is increased as the content of Cr is increased.

Table 15 shows the following facts.

Referring to samples No. 19, No. 22 and No. 26, even when only Fe out of Fe, Ni and Cr is contained in the alloy, the processing speed of the electric spark cutting and the surface roughness of the workpiece are increased and reduced, respectively, as the content of Fe is increased.

Referring to samples No. 21, No. 24 and No. 27, even when only Ni is included out of Fe, Ni and Cr is contained in the alloy, the processing speed of the electric spark cutting and the surface roughness of the workpiece are increased and reduced, respectively, as the content of Ni is increased.

Referring to samples No. 20, No. 23 and No. 28, even when only Cr out of Fe, Ni and Cr is contained in the alloy, the processing speed of the electric spark cutting and the surface roughness of the workpiece are increased and reduced, respectively, as the content of Cr is increased.

As is apparent from the comparison between the samples No. 24 and 25, when the total content of Fe, Ni and Cr exceeds 300 ppm, the processing speed is remarkably increased, and the surface roughness is remarkably reduced.

The total content of Fe, Ni and Cr may preferably in be the range of 10 to 500 ppm (weight ratio). When the content is less than 10 ppm, Fe, Ni and Cr are not very much ionized, so that the contribution to increasing the discharging capability and the tensile strength at high temperature is small. However, if the content exceeds 500 ppm, then it does not contribute anymore in improving the discharging capability and the tensile strength at high temperature, even if the content is further increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrode wire for electric spark cutting formed of a tungsten alloy comprising one or more alloying components selected from the group consisting of Y, La, Ce, Pr, Nd, Pm, Sm, Eu, Gd, Tb, Dy, Ho, Er, Tm, Yb, and Lu and oxides thereof, said tungsten alloy further comprising at least one other component selected from the group consisting of K, Si, Al and oxides of K, Si, and Al.

2. The electrode wire for electric spark cutting in accordance with claim 1, wherein the ratio of said alloying component to said tungsten alloy is at least 0.0010 wt. %.

3. The electrode wire for electric spark cutting in accordance with claim 1, wherein the ratio of said alloying component to said tungsten alloy is within the range of 0.0010 to 1.0 wt %.

4. The electrode wire for electric spark cutting according to claim 1, wherein the ratio of said alloying component to said tungsten alloy is within the range of 0.1000 to 1.0 wt %.

5. The electrode wire for electric spark cutting according to claim 1, wherein the ratio of said other component to said tungsten alloy is within the range of 0.0010 to 0.1000 wt %.

6. An electrode wire for electric spark cutting formed of a molybdenum alloy comprising at least one first component selected from the group consisting of Al, Si, K and oxides of Al, Si, and K, and wherein the ratio of at least one element selected from the group consisting of Al, Si, and K contained in said molybdenum alloy is within the range of 100 to 1,400 ppm in weight.

7. The electrode wire for electric spark cutting according to claim 6, wherein said molybdenum alloy further comprises at least one second component selected from the group consisting of Fe, Ni, and Cr.

8. The electrode wire for electric spark cutting according to claim 7, wherein the ratio of said second component in said molybdenum alloy is at least 300 ppm in weight.

9. The electrode wire for electric spark cutting according to claim 7, wherein the ratio of said second component in said molybdenum alloy is within the range of 10 to 500 ppm in weight.

10. The electrode wire for electric spark cutting according to claim 7, wherein the ratio of said second component in said molybdenum alloy is within the range of 300 to 500 ppm in weight.

* * * * *